(12) United States Patent
Srivastava et al.

(10) Patent No.: US 8,381,973 B2
(45) Date of Patent: Feb. 26, 2013

(54) SYSTEM AND METHOD FOR PROVIDING AND VERIFYING A PASSPORT

(75) Inventors: Anish K. Srivastava, Bangalore (IN); Narendra K. Burra, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 12/951,508

(22) Filed: Nov. 22, 2010

(65) Prior Publication Data
US 2012/0125997 A1    May 24, 2012

(51) Int. Cl.
   *G06K 5/00*    (2006.01)
(52) U.S. Cl. .................................. 235/380; 235/375
(58) Field of Classification Search .................. 235/380, 235/375, 487
See application file for complete search history.

(56) References Cited

U.S. PATENT DOCUMENTS

| | | | | |
|---|---|---|---|---|
| 6,726,109 B2 * | 4/2004 | Yamagishi et al. | ........... | 235/492 |
| 7,905,415 B2 * | 3/2011 | Basson et al. | ................ | 235/487 |
| 2005/0242194 A1 * | 11/2005 | Jones et al. | ................... | 235/487 |
| 2009/0090777 A1 * | 4/2009 | Ness | .............................. | 235/441 |
| 2011/0283369 A1 * | 11/2011 | Green | ............................. | 726/30 |

* cited by examiner

*Primary Examiner* — Ahshik Kim
(74) *Attorney, Agent, or Firm* — William E. Schiesser; Keohane & D'Alessandro, PLLC

(57) ABSTRACT

Embodiments of the present invention provide an approach that leverages public key infrastructure (PKI) digital signature and barcode technology in providing a passport that can be validated for authenticity and data integrity when in printed form. In one embodiment, there is a barcoding tool that includes a data retrieving component configured to retrieve a set of identity data; a data concatenating component configured to concatenate the set of identity data into a single data string; a digital signature generating component configured to generate a digital signature from the data string using a private key of an issuing authority; and a barcode generating component configured to generate a barcode symbol from the data string and a barcode symbol from the digital signature. In another embodiment, there is a barcode reading tool that includes reading the identity data and digital signature barcode symbols using a barcode reader; displaying the identity data and digital signature on a display device; verifying the digital signature; and displaying verification results on a display device.

20 Claims, 7 Drawing Sheets

SYSTEM AND METHOD FOR PROVIDING AND VERIFYING A PASSPORT

FIELD OF THE INVENTION

This invention relates generally to passports and more specifically to leveraging public key infrastructure (PKI) digital signature and barcode technology in providing a passport that can be validated for authenticity and data integrity when in printed form.

BACKGROUND OF THE INVENTION

A passport is a document issued by a national government which certifies, for the purpose of international travel, the identification and nationality of its holder. During the process of issuing a passport to a citizen, the identification details are collected, processed, and stored in the electronic form, but the passport is issued as a printed document as a booklet. If the passport is provided in electronic form, then the issuing authority can prepare a digital signature on the data content of the passport, and the relying parties or verifying authorities can verify the digital signature to prove the data integrity, authenticity, and validity of the issuer of the passport.

Since valid reasons exist for needing a passport in a printed form, there is a need to ensure the proper authentication of the issuer of the passport and the integrity of the data so that any data tampering can be detected with ease. A cost-effective and efficient solution is needed to bridge the gap between the electronic form and paper form and prove the data integrity and authenticity of a printed passport.

SUMMARY OF THE INVENTION

This disclosure describes a system and method for leveraging public key infrastructure (PKI) based digital signature and barcode technology in the issuance and verification of a passport. In using this system, a cost effective and robust solution is utilized to help ensure the integrity of the data and the authenticity of the issuer of the passport in paper form by providing a mechanism of detecting tampering and reducing forgery of passports.

In one embodiment, there is a method for generating barcode symbols for printing on a passport. In this embodiment, the method comprises: retrieving a set of identity data; concatenating the set of identity data into a single data string; generating a digital signature from the data string using a private key of an issuing authority; and generating a barcode symbol from the data string and a barcode symbol from the digital signature.

In a second embodiment, there is a method for verifying the authenticity and data integrity of a passport. In this embodiment, the method comprises: receiving a passport; reading the identity data and digital signature barcode symbols using a barcode reader; displaying the identity data and digital signature on a display device; verifying the displayed identity data matches the identity data printed on the passport; verifying the digital signature; and displaying verification results on a display device.

In a third embodiment, there is a computer system for generating barcode symbols for printing on a passport. In this embodiment, the system comprises: at least one processing unit and memory operably associated with the at least one processing unit. A barcoding tool is storable in memory and executable by the at least one processing unit. The barcoding tool comprises: a data retrieving component configured to retrieve a set of identity data; a data concatenating component configured to concatenate the set of identity data into a single data string; a digital signature generating component configured to generate a digital signature from the data string using a private key of an issuing authority; and a barcode generating component configured to generate a barcode symbol from the data string and a barcode symbol from the digital signature.

In a fourth embodiment, there is a computer-readable medium storing computer instructions which, when executed, enables a computer system to generate barcode symbols for printing on a passport, the computer readable medium comprising: program code for causing a computer system to: retrieve a set of identity data; concatenate the set of identity data into a single data string; generate a digital signature from the data string using a private key of an issuing authority; and generate a barcode symbol from the data string and a barcode symbol from the digital signature.

In a fifth embodiment, there exists a method for deploying a system for generating barcode symbols for printing on a passport. In this embodiment, a computer infrastructure is provided and is operable to: retrieve a set of identity data; concatenate the set of identity data into a single data string; generate a digital signature from the data string using a private key of an issuing authority; and generate a barcode symbol from the data string and a barcode symbol from the digital signature.

In a sixth embodiment, there is a computer system for reading the barcode symbols printed on a passport. In this embodiment, the system comprises: at least one processing unit and memory operably associated with the at least one processing unit. A barcode reading tool is storable in memory and executable by the at least one processing unit. The barcode reading tool comprises: reading the identity data and digital signature barcode symbols using a barcode reader; displaying the identity data and digital signature on a display device; verifying the digital signature; and displaying verification results on a display device.

In a seventh embodiment, there exists a method for deploying a system for verifying the data integrity and authenticity of the passport. In this embodiment, a computer infrastructure is provided and is operable to: reading the identity data and digital signature barcode symbols using a barcode reader; displaying the identity data and digital signature on a display device; verifying the digital signature; and displaying verification results on a display device.

BRIEF DESCRIPTION OF THE DRAWINGS

These and other features of this invention will be more readily understood from the following detailed description of the various aspects of the invention taken in conjunction with the accompanying drawings in which.

Figure 1:
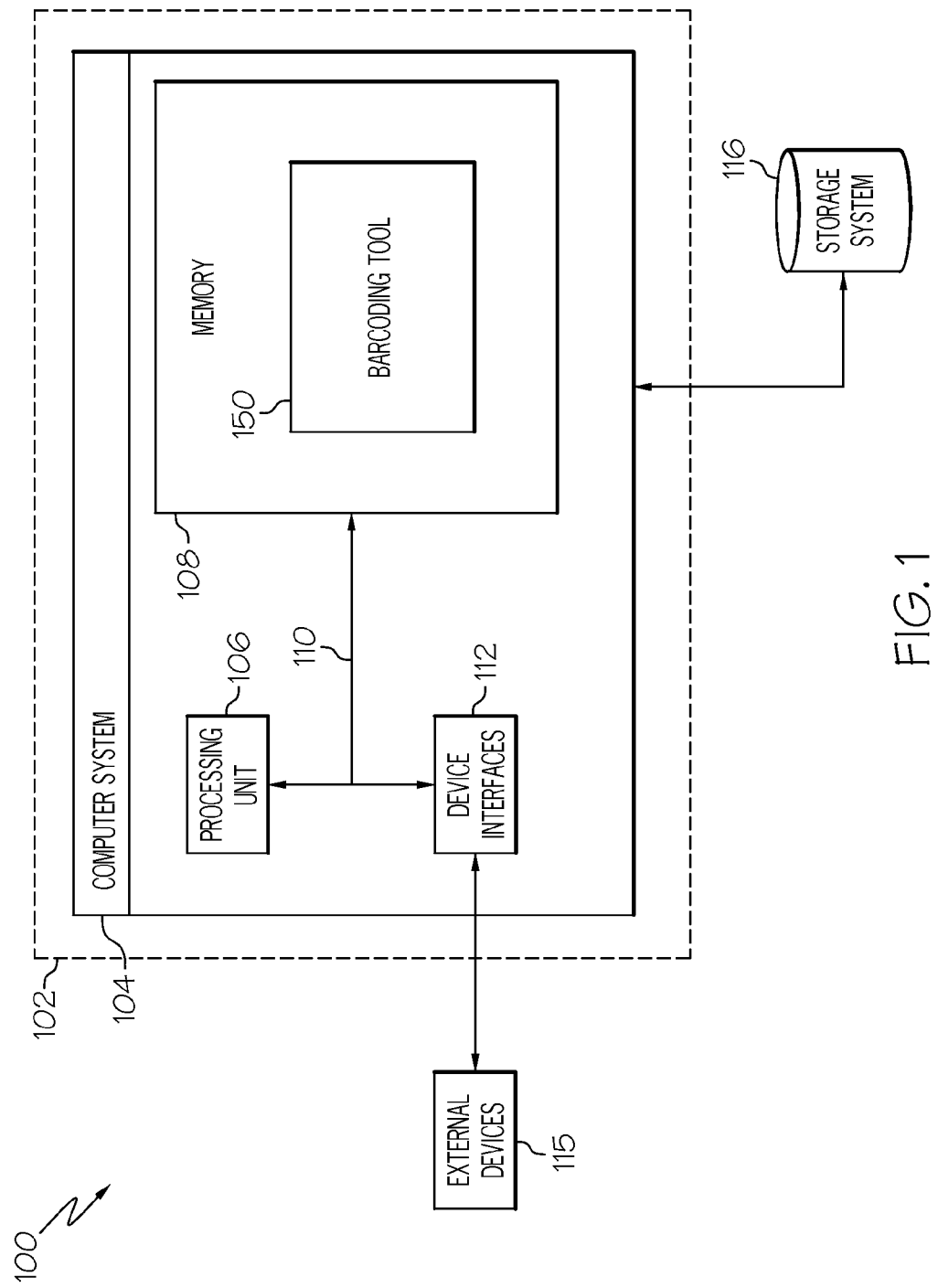
FIG. 1 illustrates a computerized implementation according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of the present invention are directed to leveraging public key infrastructure (PKI) digital signature and barcode technology in providing a passport that can be validated for authenticity and data integrity when in printed form. Specifically, a barcoding tool is used to generate a barcode symbol from a set of identity data and a barcode symbol from a digital signature. During the passport verification process, the barcodes are read and used in validating the authenticity and data integrity of the passport.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for providing a passport according to the present invention. It should be understood that any other computers implemented under the present invention may have different components/software, but will perform similar functions. As shown, computer system 104 includes a processing unit 106, memory 108 for storing a barcoding tool 150, a bus 110, and device interfaces 112.

Processing unit 106 collects and routes signals representing outputs from external devices 115 (e.g., a keyboard, a pointing device, a display, a graphical user interface, etc.) to barcoding tool 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating barcoding tool 150, which is stored in memory 108 and/or storage system 116. While executing computer program code, processing unit 106 can read and/or write data to/from memory 108, and storage system 116. Storage system 116 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

In the United States, a passport is a legal document that allows citizens to both leave from and return to national borders. A citizen planning to leave the country must obtain a passport. Citizens of the United States are required to apply for a passport through the U.S. Department of State (issuing authority). A citizen seeking a passport obtains and completes the Application for Passport form. Along with the completed application, the applicant provides proof of U.S. citizenship and proof of identification. The applicant presents the application and appropriate documentation, along with two passport photos, to the issuing authority. The application and documents are processed, and the passport is printed. The applicant pays the applicable fees and receives the passport. The entire process can take several weeks to complete.

Figure 2:
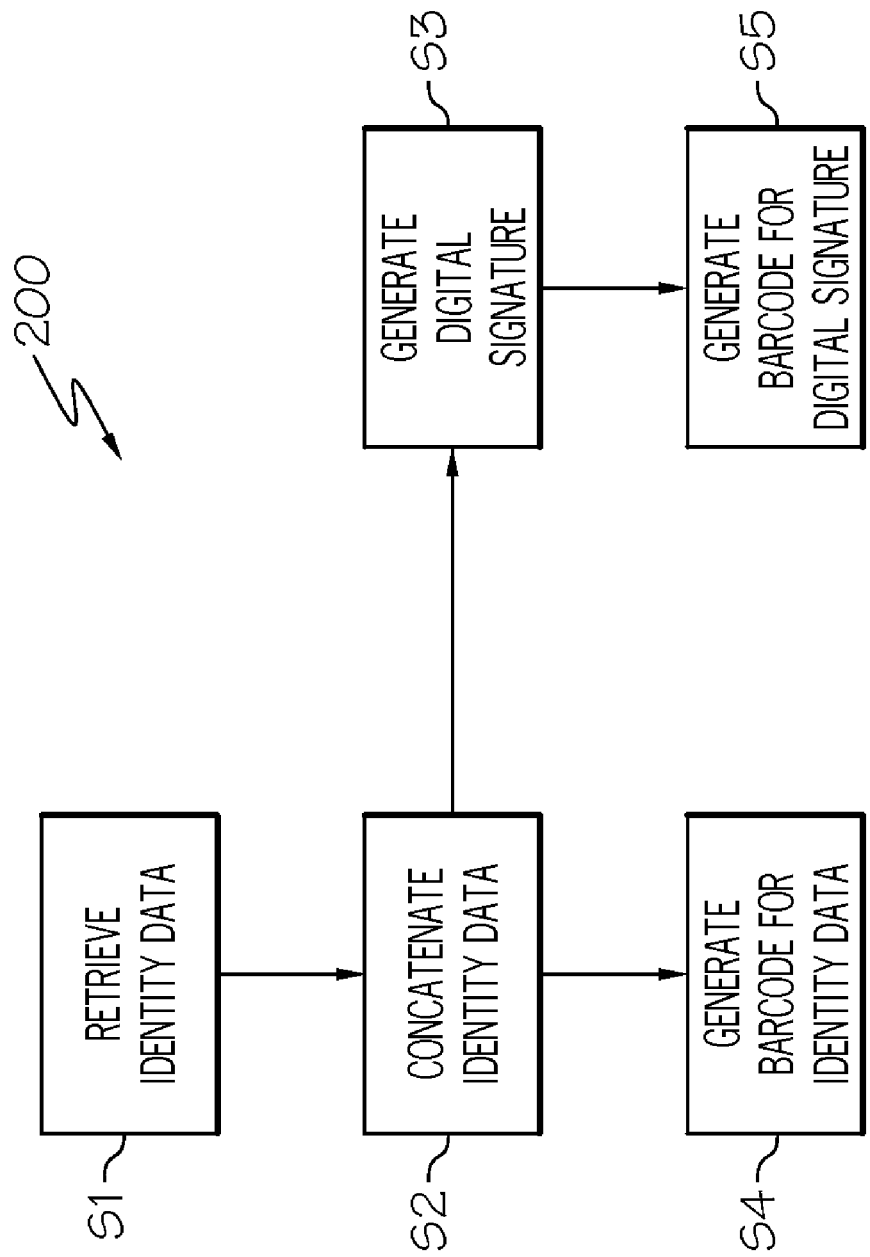
FIG. 2 depicts a flow diagram of a process for barcoding a passport according to an embodiment of the present invention.

Referring now to FIG. 2, a passport barcoding process flow 200 is depicted in which elements of the present invention may operate. The steps of processing the data provided by the applicant and producing a printed passport are described in greater detail below. As shown, the set of identity data is retrieved (step S1). The data may be retrieved by screen-scraping (i.e., collecting visual data from a source, such as a display device), user input, database table(s), or other means. The methods listed above are exemplary and not intended to be limiting. The set of identity data may include, but is not limited to, assigned passport number, applicant name, applicant date of birth, biometric template, photo, etc. The set of identity data is concatenated with a delimiter separating each field of identity data (step S2). For example, a less than symbol ('<') or other special characters may be used.

A digital signature conforming to a known standard (PKCS #7) is generated for the concatenated set of identity data using a private key of the issuing authority (step S3). Digital signatures are created and verified by cryptography which involves transforming messages into seemingly unintelligible forms and back again. Digital signatures use what is known as "public key cryptography," which employs an algorithm using two different but mathematically related "keys;" one for creating a digital signature or transforming data into a seemingly unintelligible form, and another key for verifying a digital signature or returning the message to its original form.

In one embodiment, the standard used is Public Key Cryptography Standard #7—Cryptographic Message Syntax Standard (PKCS #7). In cryptography, PKCS refers to a group of public-key cryptography standards devised and published by RSA Security. PKCS #7 is used to sign and/or encrypt messages under a public key infrastructure (PKI). PKI is a computerized form of message encryption using two keys (small files); one is public and used by the sender to encrypt the message, the other is private and used by the recipient to decrypt the message.

A two-dimensional (2D) barcode is generated for the set of identity data (step S4). A separate 2D barcode symbol is generated for the PKCS #7 digitally signed data (step S5). The 2D barcode symbol standard is selected based on the concatenated identity data size, output size of the digital signature, and the space available on the printed document to embed the resultant barcode. If the resultant data size of the concatenated identity data or digital signature does not fit into a single 2D barcode symbol, the resultant data or digital signature can be split and encoded into multiple 2D barcode symbols. The two barcodes are printed along with all other necessary information on the passport of the applicant.

Figure 3:
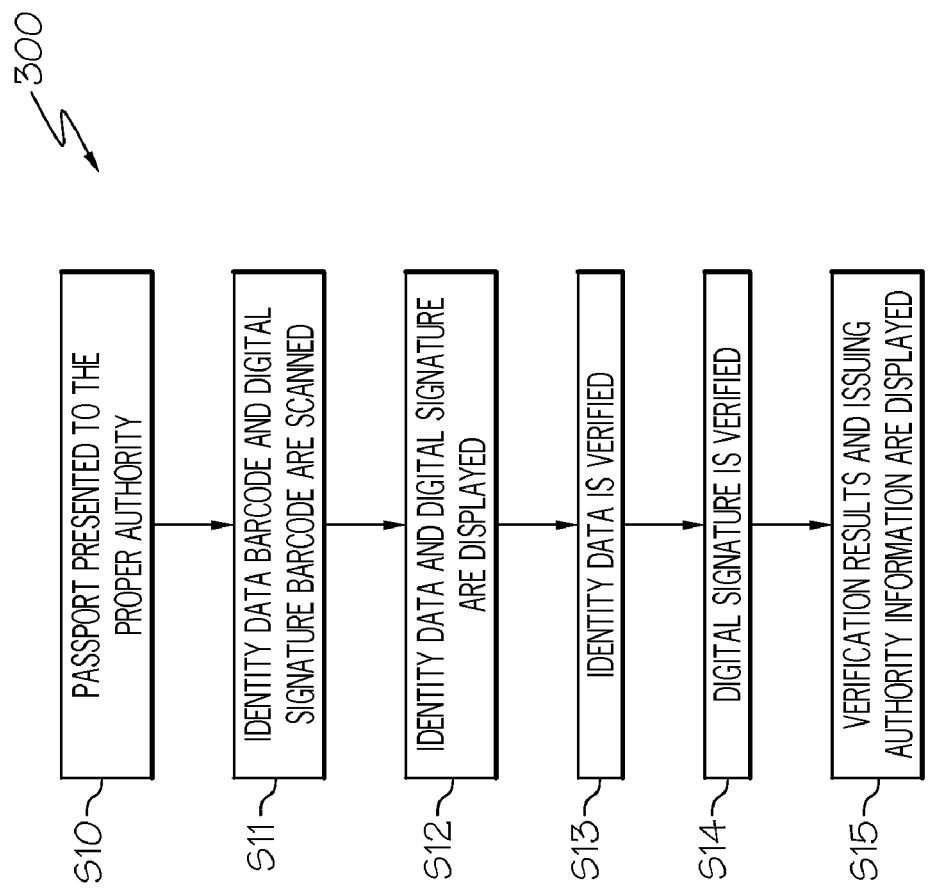
FIG. 3 depicts a flow diagram of a process for verifying a passport according to an embodiment of the present invention.

A traveler entering or leaving a country must, if required to do so, present a passport. Referring now to FIG. 3, a passport verification process flow 300 for proving the data integrity and authentication of the issuer will be described in further detail. The citizen presents the passport to verifying authority (S10). The verifying authority reads the identity data barcode symbol and the digital signature barcode symbol using a standard barcode reader (S11) that can read the barcode symbol generated in the process flow 200 of FIG. 2. The signed set of identity data is displayed on the display device (e.g., computer screen) along with the PKCS #7 digital signature (S12).

The approach of using 2D barcodes for storing citizen identification details and a PKCS #7 digital signature applied on this set of identity data and printing the 2D barcode images in the passport booklet enables the verifying authorities or relying parties to verify the data integrity and issuer authenticity, thereby helping to detect if any tampering or forgery of the identification information in the passport. The verifying authority manually checks the data printed on the passport and the data displayed on the display device (S13).

The digital signature is verified (S14). Digital signature verification is the process of checking the digital signature by reference to the original message and a given public key, thereby determining whether the digital signature was created for that same message using the private key that corresponds to the referenced public key. The digital signature is verified for data integrity, and the issuer information and verification results are displayed on the screen (S15). If positive results are returned, the identity data in the passport is not tampered and the passport is deemed to be valid and the citizen is allowed to proceed.

It will be appreciated that passport barcoding flow 200 of FIG. 2 represents one possible implementation of a process flow for printing barcodes on a passport, and that other process flows are possible within the scope of the invention. It will be further appreciated that passport verification flow 300 of FIG. 3 represents one possible implementation of a process flow for verifying a passport, and that other process flows are possible within the scope of the invention. Passport barcoding flow 200 of FIG. 2 and passport verification flow 300 of FIG. 3 illustrate the architecture, functionality, and operation of possible implementations of systems, methods, and computer program products according to various embodiments of the present invention. In this regard, each portion of each flowchart may represent a module, segment, or portion of code, which comprises one or more executable instructions for implementing the specified logical function(s). It will also be noted that each block of the flowchart illustration can be implemented by special purpose hardware-based systems that perform the specified functions or acts.

Figure 4:
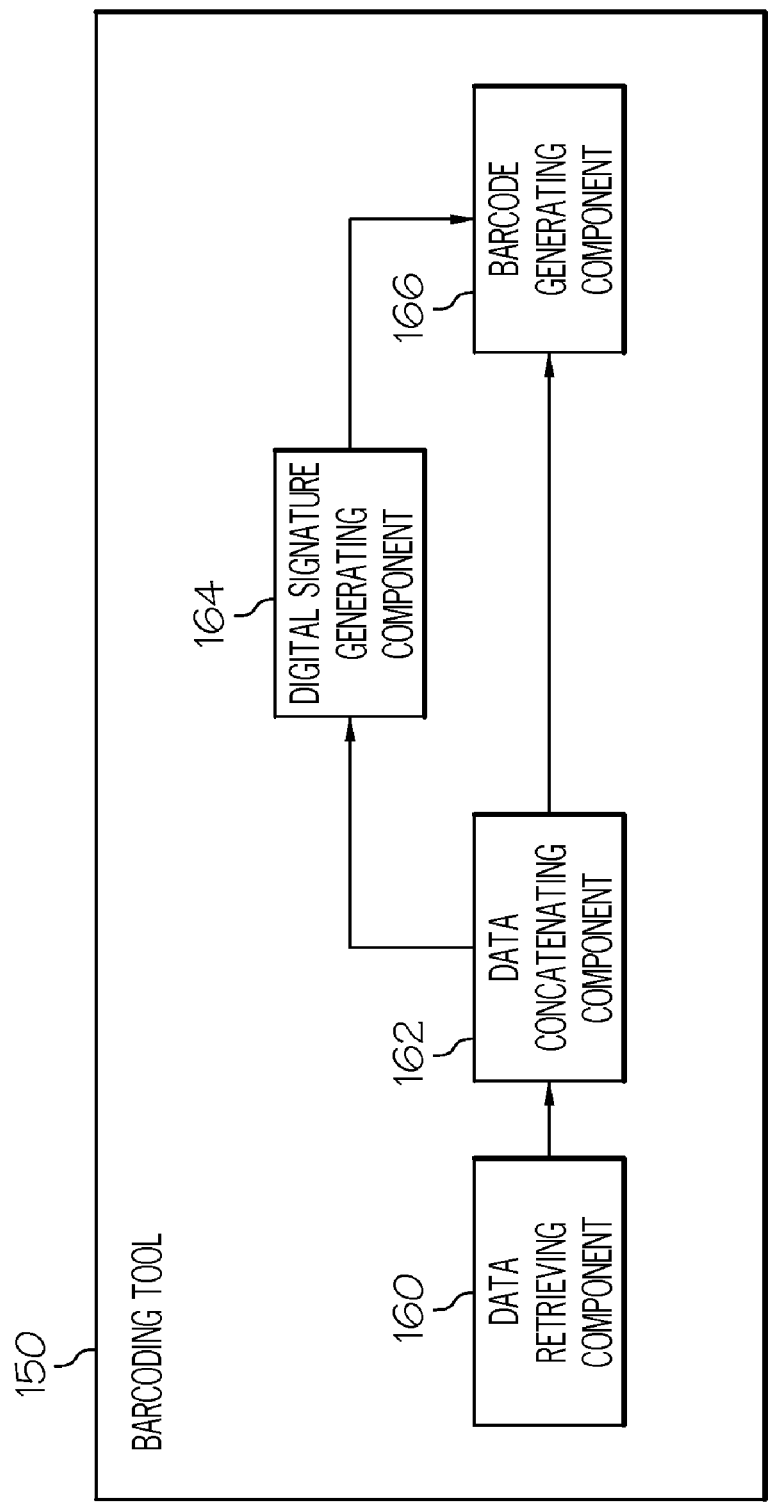
FIG. 4 depicts a barcoding tool according to an embodiment of this invention.

FIG. 4 shows a more detailed view of an exemplary barcoding tool 150 shown in FIG. 1. Barcoding tool 150 comprises data retrieving component 160, data concatenating component 162, digital signature generating component 164, and barcode generating component 166.

Figure 5:
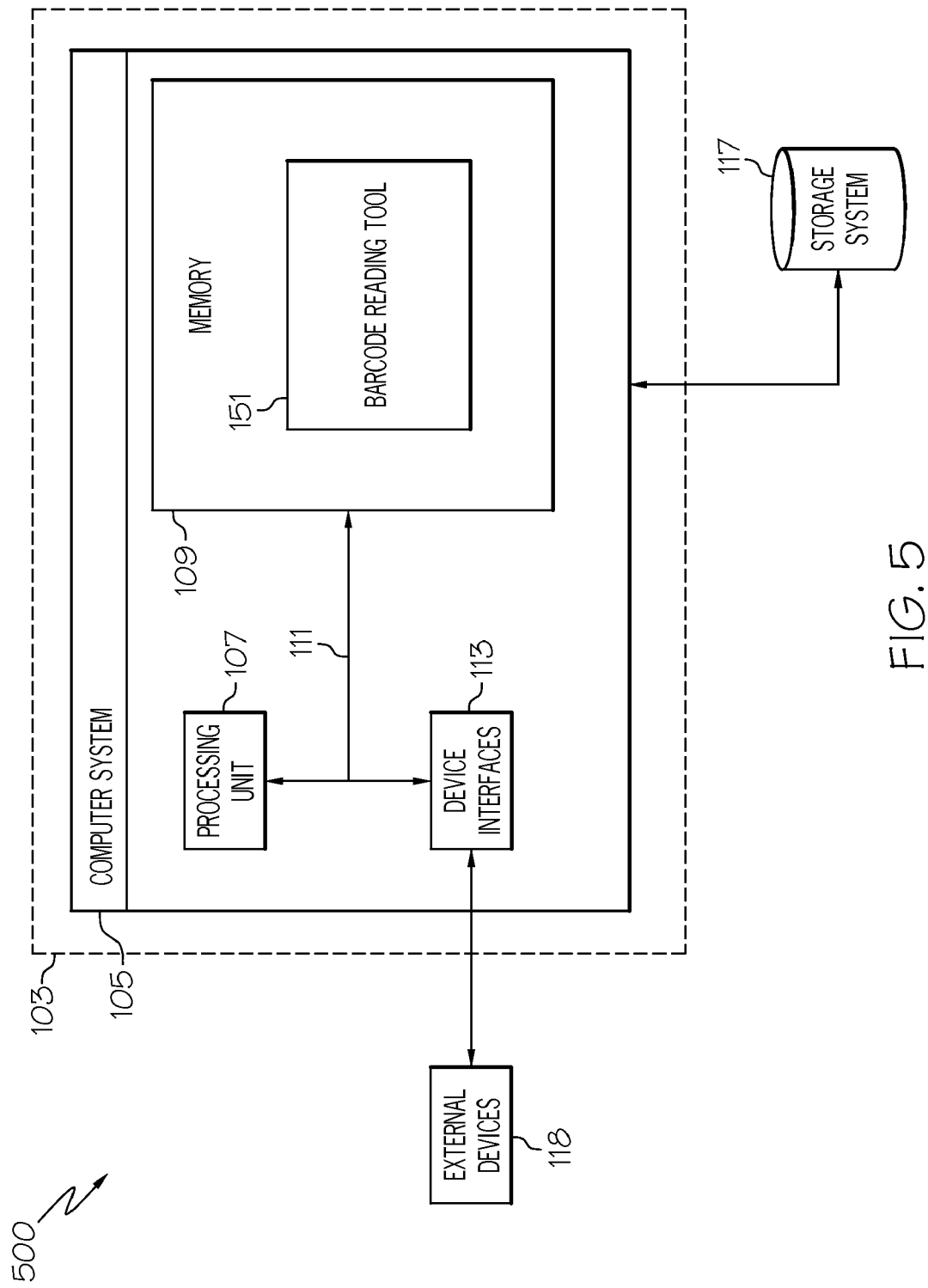
FIG. 5 illustrates a computerized implementation according to an embodiment of the present invention.

FIG. 5 illustrates a computerized implementation 500 of the present invention. As depicted, implementation 500 includes computer system 105 deployed within a computer infrastructure 103. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 103 is intended to demonstrate that some or all of the components of implementation 500 could be deployed, managed, serviced, etc., by a service provider who offers to implement, deploy, and/or perform the functions of the present invention for others.

Computer system 105 is intended to represent any type of computer system that may be implemented in deploying/realizing the teachings recited herein. In this particular example, computer system 105 represents an illustrative system for verifying a passport according to the present invention. It should be understood that any other computers implemented under the present invention may have different components/software, but will perform similar functions. As shown, computer system 105 includes a processing unit 107, memory 109 for storing a barcode reading tool 151, a bus 111, and device interfaces 113.

Processing unit 107 collects and routes signals representing outputs from external devices 118 (e.g., a keyboard, a pointing device, a display, a graphical user interface, Barcode reader etc.) to barcode reading tool 151. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 107 executes computer program code, such as program code for operating barcode reading tool 151, which is stored in memory 109 and/or storage system 117. While executing computer program code, processing unit 107 can read and/or write data to/from memory 109, and storage system 117. Storage system 117 can include VCRs, DVRs, RAID arrays, USB hard drives, optical disk recorders, flash storage devices, or any other similar storage device. Although not shown, computer system 105 could also include I/O interfaces that communicate with one or more external devices 118 that enable a user to interact with computer system 105.

Figure 6:
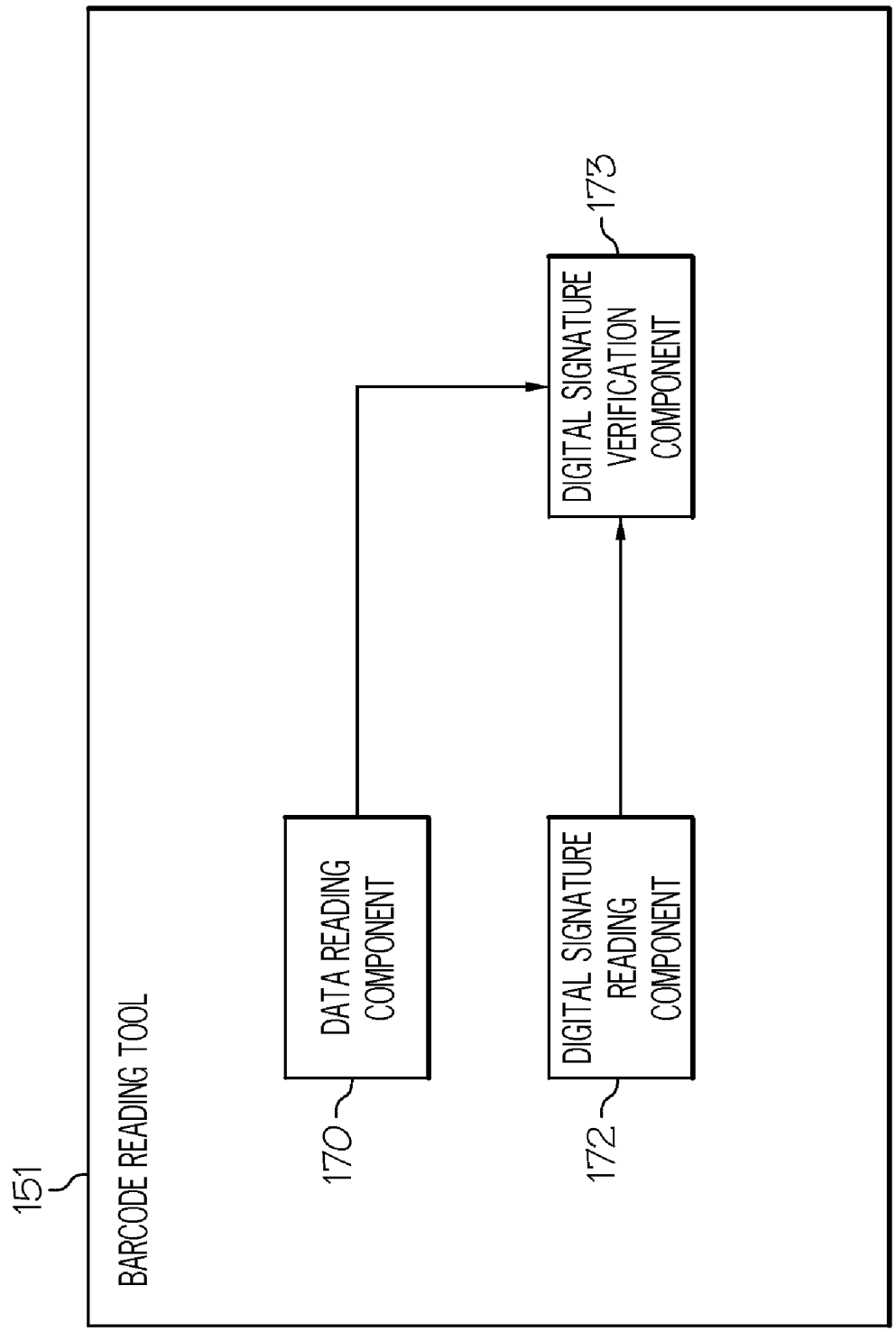
FIG. 6 depicts a barcode reading tool according to an embodiment of this invention.

FIG. 6 shows a more detailed view of an exemplary barcode reading tool 151 shown in FIG. 5. Barcode reading tool 151 comprises identity data reading component 170, digital signature reading component 172; digital signature verifying component 173; and displaying the identity data and digital signature verification details on one of external devices 118 shown in FIG. 5 (in this case, an external display device).

Referring now to FIG. 6, as an example, an applicant named John Smith wishes to apply for a passport. John completes the application, submits the application to the issuing authority along with proof of citizenship (birth certificate), proof of identification (valid driver's license) and two photos. The documents are processed and the passport is printed. The passport is printed with two barcodes. To produce the barcodes, a set of identity data that is provided to the issuing authority is used. For example, applicant John Smith is assigned passport number '12345'. His date of birth is 'Jan. 1, 1960'. For illustrative purposes, the other details retrieved are hereinafter referred to as 'Detail-A', 'Detail-B', and 'Detail-C'. These data items (passport number, name, date of birth, Detail-A, Detail-B, and Detail-C) make up the set of identity data that will be used.

Referring now to FIG. 4, the set of identity data is retrieved by data retrieving component 160. Data concatenating component 162 concatenates the data using a '<' as a data delimiter. An exemplary resultant that is generated appears as the following string: "12345<JohnSmith<19600101<Detail-A<Detail-B<Detail-C". The set of identity data used in the concatenated string example above is for illustration only and not intended to be limiting. Additional or different identification data items which are printed on the passport may be used.

Figure 7:
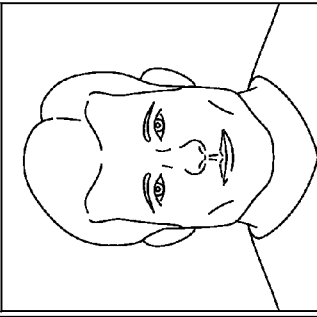
FIG. 7 depicts a sample passport with barcode symbols for identity data and digital signature as generated by a barcoding tool according to one embodiment of this invention.

Digital signature generating component 164 generates a digital signature. This digital signature is generated on the concatenated set of identity data (in this example, passport number, name, date of birth, Detail-A, Detail-B, and Detail-C). Barcode generating component 166 generates two separate 2D barcodes. First, a 2D barcode symbol is generated for the set of concatenated identity data provided. Second, a 2D barcode symbol is generated to store the PKCS #7 digitally signed data. The two barcodes are printed on the passport. As an exemplary, FIG. 7 depicts a sample passport with barcode symbols for the data and the digital signature generated by barcoding tool.

The present invention provides an approach for providing a passport that can be validated for authenticity and data integrity when in printed form. In particular, the present invention includes a barcoding tool comprising: a data retrieving component configured to retrieve a set of identity data; a data concatenating component configured to concatenate the set of identity data into a single data string; a digital signature generating component configured to generate a digital signature from the data string using a private key of an issuing authority; and a barcode generating component configured to generate a barcode symbol from the data string and a barcode symbol from the digital signature. This provides significant benefits by assisting in detection of tampering and forgery of the passport.

Further, it can be appreciated that the methodologies disclosed herein can be used within a computer system to provide a passport that can be validated for authenticity and data integrity when in printed form. In this case, barcoding tool 150 can be provided, and one or more systems for performing the processes described in the invention can be obtained and deployed to computer infrastructure 102. To this extent, the deployment can comprise one or more of: (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on, that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Further, it can be appreciated that the methodologies disclosed herein can be used within a computer system to verify a passport that can be validated for authenticity and data integrity when in printed form. In this case, barcode reading tool 151 can be provided, and one or more systems for performing the processes described in the invention can be obtained and deployed to computer infrastructure 103. To this extent, the deployment can comprise one or more of: (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 105 may be described in the general context of computer-executable instructions, such as program modules, being executed by a computer. Generally, program modules include routines, programs, people, components, logic, data structures, and so on, that perform particular tasks or implements particular abstract data types. Exemplary computer system 105 may be practiced in distributed computing environments where tasks are performed by remote processing devices that are linked through a communications network. In a distributed computing environment, program modules may be located in both local and remote computer storage media including memory storage devices.

Furthermore, an implementation of exemplary computer system 104 or 105 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for generating barcodes for printing on a passport. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for generating barcodes for printing on a passport, comprising:
   retrieving a set of identity data;
   concatenating the set of identity data into a single data string;
   generating a digital signature from the data string using a private key of an issuing authority;
   generating a first barcode symbol from the data string; and
   generating a second barcode symbol from the digital signature.

2. The method according to claim 1, wherein the first barcode symbol and second barcode symbol are generated from at least one of the standardized barcode symbology libraries.

3. The method according to claim 2, wherein the standardized barcode symbology libraries consist of the group of UPC-A, UPC-E, ISBN, RSS-14, RSS-14E, RSS-14L, Interleaved 2 of 5, BAN/JAN-8, EAN/JAN-13, Code 3, Code 39 Full ASCII, Code 128, PDF417, QR Code, and Data Matrix.

4. The method according to claim 1, wherein the digital signature is prepared using Public Key Cryptography Standard #7-Cryptographic Message Syntax Standard (PKCS #7).

5. The method according to claim 1, further comprising a delimiter, wherein the delimiter separates the fields of the concatenated set of identity data.

6. A method for generating barcodes for verifying the authenticity of a passport, comprising:
   receiving a passport having a first barcode symbol and a second barcode symbol, wherein the first barcode symbol comprises identity data and the second barcode symbol comprises a digital signature;
   reading the first barcode symbol and the second barcode symbol using a barcode reader;
   displaying the identity data and the digital signature on a display device;
   verifying the displayed identity data matches identity data printed on the passport;
   verifying the digital signature; and
   displaying verification results on the display device.

7. The method according to claim 6, wherein the first barcode symbol and the second barcode symbol are generated from at least one of the standardized barcode symbology libraries.

8. The method according to claim 7, wherein the standardized barcode symbology libraries consist of the group of UPC-A, UPC-E, ISBN, RSS-14, RSS-14E, RSS-14L, Interleaved 2 of 5, BAN/JAN-8, EAN/JAN-13, Code 3, Code 39 Full ASCII, Code 128, PDF417, QR Code, and Data Matrix.

9. The method according to claim 6, wherein the digital signature is prepared using Public Key Cryptography Standard #7-Cryptographic Message Syntax Standard (PKCS #7).

10. The method according to claim 6, further comprising displaying information relating to the issuing authority on the display device.

11. A computer system for generating barcodes for verifying the authenticity of a passport, comprising:
    at least one processing unit;
    memory operably associated with the at least one processing unit; and
    a barcoding tool storable in memory and executable by the at least one processing unit, the barcoding tool comprising:
      retrieving a set of identity data;
      concatenating the set of identity data into a single data string;
      generating a digital signature from the data string using a private key of an issuing authority;
      generating a first barcode symbol from the data string; and
      generating a second barcode symbol from the digital signature.

12. The computer system according to claim 11, wherein the first barcode symbol and the second barcode symbol are generated from at least one of the standardized barcode symbology libraries.

13. The computer system according to claim 12, wherein the standardized barcode symbology libraries consist of the group of UPC-A, UPC-E, ISBN, RSS-14, RSS-14E, RSS-14L, Interleaved 2 of 5, BAN/JAN-8, EAN/JAN-13, Code 3, Code 39 Full ASCII, Code 128, PDF417, QR Code, and Data Matrix.

14. The computer system according to claim 11, wherein the digital signature is prepared using Public Key Cryptography Standard #7-Cryptographic Message Syntax Standard (PKCS #7).

15. The computer system according to claim 11, further comprising a delimiter, wherein the delimiter separates the fields of the concatenated set of identity data.

16. A computer-readable medium storing computer instructions which, when executed, enables a computer system to generate barcodes for verifying the authenticity of a passport, the computer instructions comprising:
    receiving a passport having a first barcode symbol and a second barcode symbol wherein the first barcode symbol comprises identity data and the second barcode symbol comprises a digital signature;
    reading the first barcode symbol and the second barcode symbol using a barcode reader;
    displaying the identity data and the digital signature on a display device;
    verifying the displayed identity data matches identity data printed on the passport;
    verifying the digital signature; and
    displaying verification results on the display device.

17. The computer-readable medium according to claim 16, wherein the first barcode symbol and the second barcode symbol are generated from at least one of the standardized barcode symbology libraries.

18. The computer-readable medium according to claim 17, wherein the standardized barcode symbology libraries consist of the group of UPC-A, UPC-E, ISBN, RSS-14, RSS-14E, RSS-14L, Interleaved 2 of 5, BAN/JAN-8, EAN/JAN-13, Code 3, Code 39 Full ASCII, Code 128, PDF417, QR Code, and Data Matrix.

19. The computer-readable medium according to claim 16, wherein the digital signature is prepared using Public Key Cryptography Standard #7-Cryptographic Message Syntax Standard (PKCS #7).

20. The computer-readable medium according to claim 16, further comprising a delimiter, wherein the delimiter separates the fields of the concatenated set of identity data.

* * * * *